United States Patent
Moon et al.

(10) Patent No.: US 9,218,726 B2
(45) Date of Patent: Dec. 22, 2015

(54) AUTOMATED TELLER MACHINE AND MEDIUM DETECTING DEVICE

(75) Inventors: Chan Woo Moon, Seoul (KR); Hyun Kim, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 475 days.

(21) Appl. No.: 13/386,571

(22) PCT Filed: Jun. 10, 2010

(86) PCT No.: PCT/KR2010/003754
§ 371 (c)(1),
(2), (4) Date: Jan. 23, 2012

(87) PCT Pub. No.: WO2011/010795
PCT Pub. Date: Jan. 27, 2011

(65) Prior Publication Data
US 2012/0119736 A1 May 17, 2012

(30) Foreign Application Priority Data

Jul. 23, 2009 (KR) .................. 10-2009-0067476
Feb. 1, 2010 (KR) .................. 10-2010-0008898

(51) Int. Cl.
*G01R 33/02* (2006.01)
*G07F 19/00* (2006.01)
(Continued)

(52) U.S. Cl.
CPC .............. *G07F 19/205* (2013.01); *G06K 7/084* (2013.01); *G06K 13/16* (2013.01); *G07D 7/04* (2013.01); *G07D 11/0021* (2013.01); *G07F 7/0873* (2013.01); *G07F 19/20* (2013.01)

(58) Field of Classification Search
CPC .... G01R 33/00; G01R 33/22; G07D 11/0021; G07D 7/04; G06K 19/06187; G06K 7/084; G06K 7/087; G06K 1/125; G07F 19/00; G07F 19/20; G07F 19/201; G07F 19/202; G07F 19/205; G07F 7/20; G07F 7/0873
USPC .................. 324/252, 200; 235/379, 381, 449; 271/3.17, 3.18, 64; 312/211
See application file for complete search history.

(56) References Cited

U.S. PATENT DOCUMENTS 3,370,157 A     2/1968 Lockey et al.
4,345,834 A *   8/1982 Kimura et al. ................ 399/167
(Continued)

FOREIGN PATENT DOCUMENTS

EP    1964801 A2    9/2008
JP    2004-206362 A 7/2004
(Continued)

OTHER PUBLICATIONS

International Search Report in International Application No. PCT/KR2010/003754, filed Jun. 10, 2010.
(Continued)

*Primary Examiner* — Minh N Tang
*Assistant Examiner* — Thang Le
(74) *Attorney, Agent, or Firm* — Saliwanchik, Lloyd & Eisenschenk

(57) ABSTRACT

A medium detecting device is provided. The medium detecting device includes a sensor adapted to detect magnetism of a medium being transferred; and a pressing unit adapted to press the medium toward the sensor, and the pressing unit includes at least one supporting part including a plurality of supporters to press the medium toward the sensor; and an elastic member adapted to elastically support the supporting part.

14 Claims, 8 Drawing Sheets

(51) Int. Cl.
*G07D 7/04* (2006.01)
*G07D 11/00* (2006.01)
*G07F 7/08* (2006.01)
*G06K 7/08* (2006.01)
*G06K 13/16* (2006.01)

(56) References Cited

U.S. PATENT DOCUMENTS

| | | | | |
|---|---|---|---|---|
| 5,003,423 | A | * | 3/1991 | Imamura et al. .......... 360/125.03 |
| 5,808,290 | A | * | 9/1998 | Umeno .......................... 235/475 |
| 7,305,113 | B2 | * | 12/2007 | Yoshida et al. ............... 382/135 |
| 2006/0186198 | A1 | * | 8/2006 | Terao et al. ................... 235/381 |
| 2007/0164097 | A1 | * | 7/2007 | Kwak et al. .................. 235/379 |
| 2008/0210760 | A1 | | 9/2008 | Uehara et al. |
| 2009/0218757 | A1 | * | 9/2009 | Terashima .................... 271/225 |
| 2011/0031308 | A1 | * | 2/2011 | Holland-Letz et al. ....... 235/379 |
| 2012/0175415 | A1 | * | 7/2012 | VanKirk et al. .............. 235/379 |

FOREIGN PATENT DOCUMENTS

| | | | |
|---|---|---|---|
| JP | 2004206362 | * | 7/2004 |
| KR | 10-2009-0067752 A | | 6/2009 |
| KR | 10-2009-0068545 A | | 6/2009 |

OTHER PUBLICATIONS

European Search Report dated Dec. 4, 2013, in European Application No. 10802388.8.
Chinese Notice of Allowance dated Dec. 25, 2013, in Chinese Application No. 201080003393.1.
Office Action dated Mar. 18, 2013 in Chinese Application No. 201080003393.1, filed Jun. 10, 2010.

* cited by examiner

AUTOMATED TELLER MACHINE AND MEDIUM DETECTING DEVICE

CROSS-REFERENCE TO RELATED APPLICATIONS

This application is the U.S. national stage application of International Patent Application No. PCT/KR2010/003754, filed Jun. 10, 2010, which claims priority to Korean Application Nos. 10-2009-0067476, filed Jul. 23, 2009, and 10-2010-0008898, filed Feb. 1, 2010, the disclosures of each of which are incorporated herein by reference in their entirety.

TECHNICAL FIELD

The present disclosure relates to an automated teller machine (ATM) and a medium detecting device.

BACKGROUND ART

A medium detecting device detects a medium being transferred by using a sensor and determines genuineness of the medium. For example, the medium detecting device may be applied to an ATM enabling a customer to bank with a bank or the like.

Objective mediums for the medium detecting device include banknotes, checks, securities such as gift certificates or the like.

A magneto-resistive (MR) sensor adapted to detect magnetism contained in a medium may be used as the sensor of the medium detecting device. Since sensing accuracy of the medium detecting device is determined by detection accuracy of the MR sensor, it is required to accurately detect magnetism of the medium at the MR sensor.

DISCLOSURE

Technical Problem

Embodiments provide a medium detecting device and an automated teller machine (ATM) capable of accurately determining genuineness of a medium.

Technical Solution

In one embodiment, a medium detecting device includes a sensor adapted to detect magnetism of a medium being transferred; and a pressing unit adapted to press the medium toward the sensor, wherein the pressing unit includes at least one supporting part including a plurality of supporters to press the medium toward the sensor; and an elastic member elastically supporting the supporting part.

The plurality of supporters may be spaced from each other by a predetermined interval, and a rotating member may be rotatably disposed between the supporters.

The rotating member may be rotatably mounted to the plurality of supporters.

An upper end of the rotating member may be disposed lower than an upper end of the supporters.

The rotating member may have a cylindrical shape and be brought into contact with the medium partly or entirely in a length direction thereof.

The rotating member may include a rotation body, and at least one contact part protruding in a circumferential direction of the rotation body to contact the medium.

The medium detecting device may further include a mounting part adapted to rotatably support the supporting part, wherein the rotating member may be rotatably mounted to the mounting part.

The sensor may be disposed in a region between the supporters such that the supporters do not overlap the sensor.

The medium detecting device may further include a mounting part adapted to rotatably support the supporting part, wherein the elastic member may be mounted to the mounting part to apply an elastic force to the supporting part such that the supporting part is biased toward the sensor.

In another embodiment, an automated teller machine (ATM) includes a medium entrance through which a medium is inserted and withdrawn; a transfer unit adapted to transfer the medium inserted through the entrance; a sensor adapted to detect magnetism of the medium being transferred by the transfer unit; and a supporting part adapted to support the medium being transferred, wherein the supporting part includes a plurality of supporters spaced apart from each other, the supporters being spaced apart from the sensor.

The automated teller machine may further include a rotating member mounted to the plurality of supporters and disposed between the supporters.

The rotating member may be spaced apart from the sensor.

The rotating member may partly or entirely contact the sensor. The automated teller machine may further include a mounting part adapted to rotatably support the supporting part, wherein the mounting part includes a rotating member, and the rotating member is disposed between the plurality of supporters.

Advantageous Effects

According to the exemplary embodiments, since a plurality of supporters are not in contact with a sensor, damage of the sensor is prevented.

A rotating member is rotated by contact with a medium being transferred. Here, since the rotating member forms a line contact with the medium, the rotating member may be minimally smeared with dust of the medium which contains a magnetic component.

Furthermore, although the rotating member is smeared with dust, the dust may fall down by a rotating motion of the rotating member, thus being prevented from remaining on the rotating member. Accordingly, addition of the dust onto the medium may also be prevented, thereby increasing sensing accuracy of the sensor.

In addition, since the rotating member as well as the supporting part supports the medium, droop of the medium is prevented, thereby promoting transfer of the medium and enabling close contact between the medium and the sensor. Accordingly, reduction of sensing accuracy of the sensor may be prevented.

Furthermore, since contact between the rotating member and the sensor is not achieved or minimized, for example, to form only a line contact, damage of the sensor may be minimized.

MODE FOR INVENTION

Figure 1:
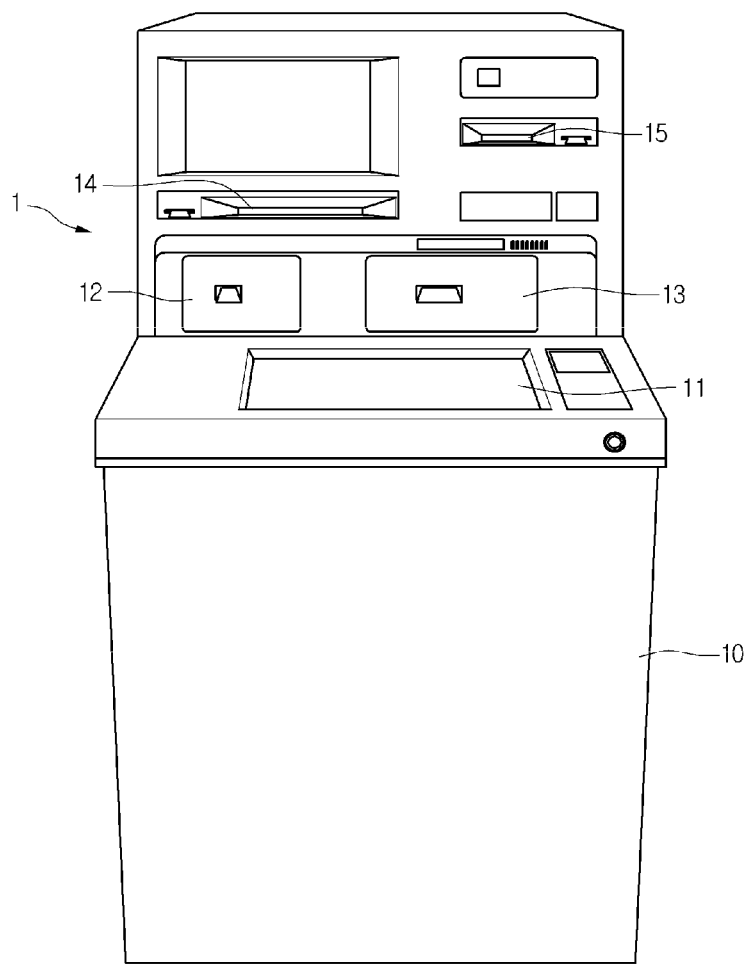
FIG. 1 is a perspective view of an automated teller machine (ATM) according to an embodiment.

Reference will now be made in detail to the embodiments of the present disclosure, examples of which are illustrated in the accompanying drawings. It is noted that similar reference numerals denotes similar elements in appreciating the drawings. In addition, in describing the embodiments, well known structures and functions will be omitted not to obscure the invention.

Furthermore, although terms such as first, second, A, B, (a), (b), and the like may be used in the following description, characteristics or orders of the elements are not specifically defined by those terms. When a certain element or part is described as being linked, coupled, or connected to another element or part, it should be understood that the former may be directly linked, coupled, or connected to the latter or via other additional elements linked, coupled, or connected between the respective elements.

Figure 2:
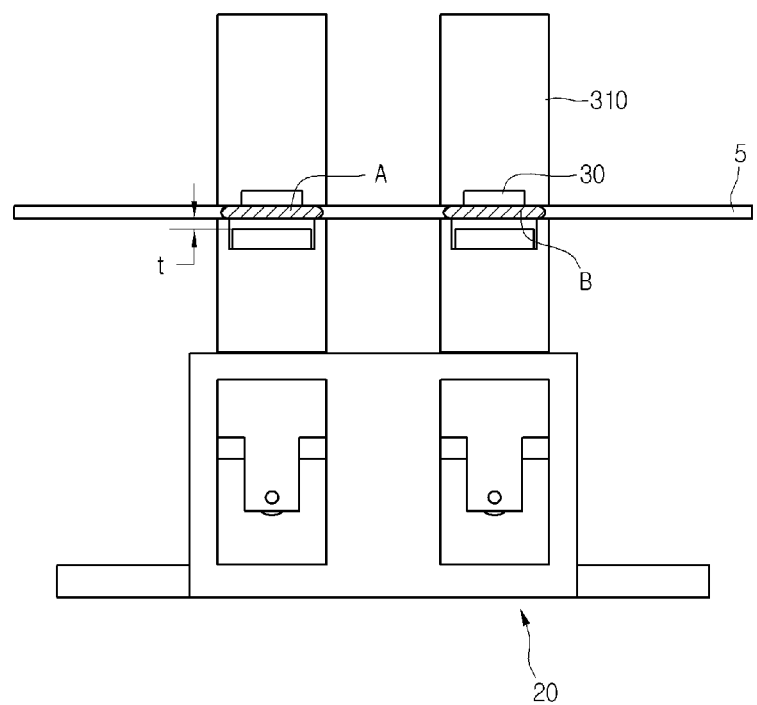
FIG. 2 is a front view of a medium detecting device according to the embodiment.

FIG. 1 is a perspective view of an automated teller machine (ATM) according to a first embodiment. FIG. 2 is a front view of a medium detecting device according to the first embodiment.

Referring to FIGS. 1 and 2, a medium detecting device 16 of the first embodiment may be applied to an auto mated teller machine (ATM) 1. However, not limited thereto, the medium detecting device may be independently installed at a place where mediums are traded.

In the first embodiment, the medium may include banknotes, checks, and securities such as an exchange ticket. The ATM 1 includes a main body 10 adapted to accommodate the medium detecting device 16. The main body 10 includes an input unit 11 through which a user performs banking, a check entrance 12 for entrance and exit of checks, a banknote entrance 13 for entrance and exit of banknotes, a bankbook slot 14 for entrance and exit of a bankbook, and a card slot 15 for entrance and exit of a bank card. Since the above structures of the ATM 1 may be achieved by generally known structures, detailed descriptions thereof will be omitted.

In a case where the medium detecting device 16 is applied in the ATM, genuineness of checks and banknotes can be determined by the medium detecting device 16. The ATM may include a plurality of the medium detecting devices 16.

Hereinafter, the medium detecting device 16 according to the first embodiment will be described in detail.

Figure 3:
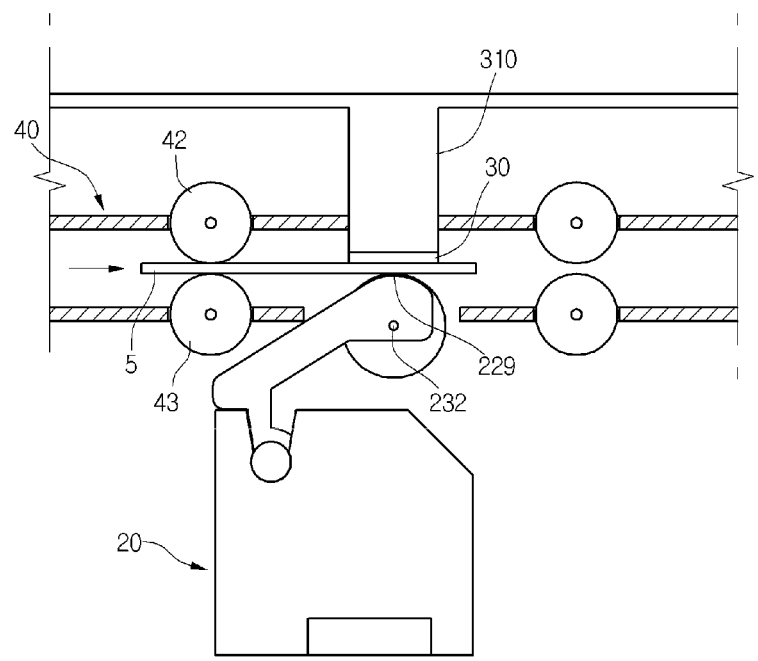
FIG. 3 is a side view of the medium detecting device according to the embodiment.
Figure 4:
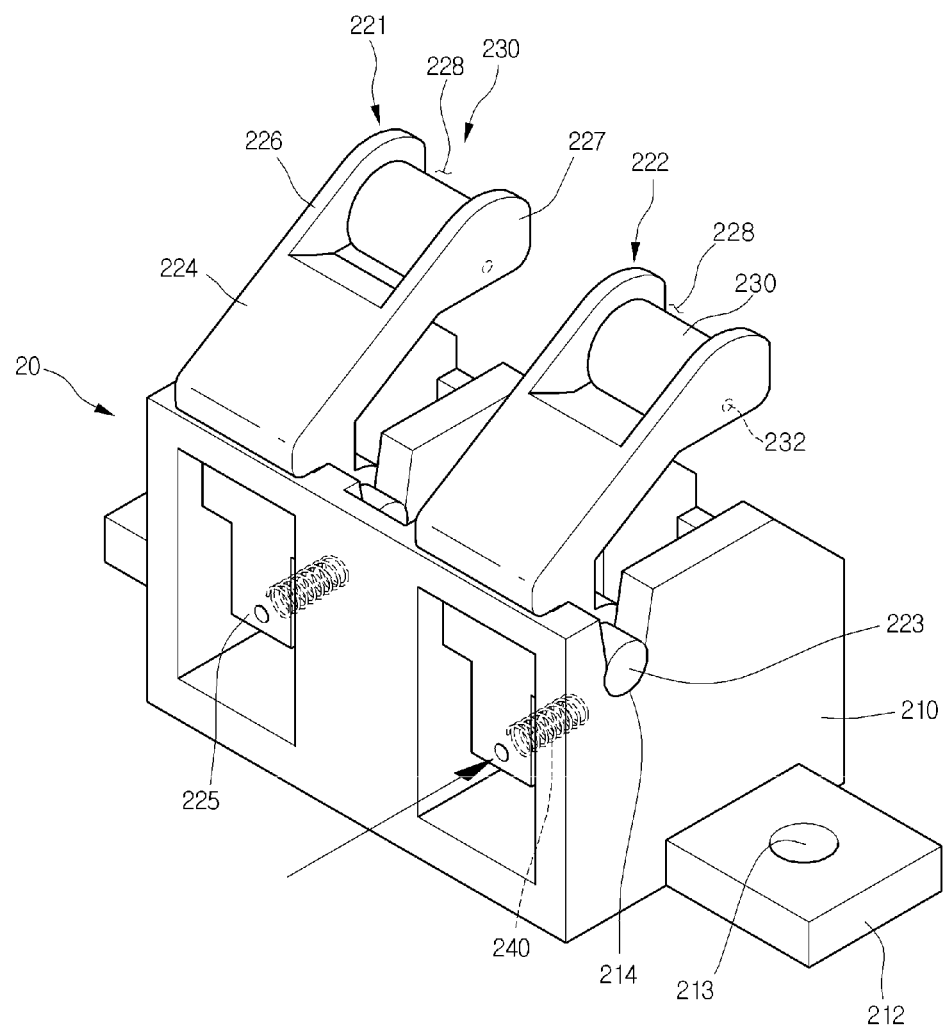
FIG. 4 is a perspective view of a pressing unit constituting the medium detecting device according to the embodiment.

FIG. 3 is a side view of the medium detecting device according to the embodiment. FIG. 4 is a perspective view of a pressing unit constituting the medium detecting device according to the first embodiment.

Referring to FIGS. 1 through 4, the medium detecting device 16 comprises a transfer unit 40 adapted to transfer a medium 5 inserted through the check entrance 12 or the banknote entrance 13, a pressing unit 20 adapted to support the medium 5 being transferred by the transfer unit 40, at least one magneto-resistive (MR) sensor 30 adapted to detect magnetism of the medium 5 being transferred. Hereinafter, the MR sensor 30 will be referred to as merely a "sensor" for conciseness.

The transfer unit 40 comprises a plurality of rollers 42 and 43 disposed in an up and down direction. The medium 5 passes through between the rollers 42 and 43.

The pressing unit 20 is disposed under the sensor 30 to support and bias the medium 5 being transferred against the sensor 30. That is, the medium 5 is passed through between the pressing unit 20 and the sensor 30. The pressing unit 20 comprises a mounting part 210 provided within the main body 10, one or more supporting parts 221 and 222 rotatably supported by the mounting part 210, and a rotating member 230 rotatably mounted to the supporting parts 221 and 222.

The number of the supporting parts 221 and 222 may be plural so as to stably support the medium 5. In the first embodiment, for example, two supporting parts 221 and 222 are provided.

The mounting part 210 comprises a fixing plate 212 for fixing the mounting part 210 to a predetermined position of the main body 10. The fixing plate 212 includes a fastening hole 213 for engagement with a fastening member such as a screw. In addition, a shaft seating part 214 to seat thereon shafts 223 of the respective supporting parts 221 and 222 is formed at an upper part of the mounting part 210.

The supporting parts 221 and 222 are mounted to the mounting part 210, in a state of being spaced from each other. The supporting parts 221 and 222 are capable of independently rotating. Alternatively, the supporting parts 221 and 222 may rotate about a single common shaft.

Each of the supporting parts 221 and 222 comprises the shaft 223 being a center of rotation, a first extension part 224 extending upward from the shaft 223, and a second extension part 225 extending downward from the shaft 223. The first extension part 224 comprises a plurality of supporters 226 and 227 for coupling with the rotating member 230.

The supporters 226 and 227 are spaced apart from each other, with a space 228 formed therebetween for disposition of the rotating member 230.

A distance between the plurality of supporters 226 and 227 is greater than a lateral width of the sensor 30, with reference to FIG. 2. That is, the supporters 226 and 227 do not overlap the sensor 30. In addition, the supporters 226 and 227 are spaced apart from the sensor 30.

Here, the sensor 30 may be protected by a sensor housing 310 while the plurality of supporters 226 and 227 are mounted in contact with the sensor housing 310.

Thus, since the sensor 30 is disposed between the supporters 226 and 227 and the supporters 226 and 227 are not in contact with the sensor 30 but in contact with the sensor housing 310, damage of the sensor 30 by the supporters 226 and 227 can be prevented.

Here, the lateral width of the sensor 30 is disposed perpendicular to a direction in which the medium 5 is transferred.

The medium 5 is supported actually by upper surfaces of the supporters 226 and 227. The rotating member 230 is rotatably coupled to the supporters 226 and 227 through a rotational shaft 232.

Here, as shown in FIG. 2, a predetermined gap "t" is formed between a highest position 229 of each of the supporters 226 and 227 and an upper surface of the rotating member 230. That is, the rotating member 230 does not directly contact the sensor 30.

It is exemplary that the gap "t" is determined in consideration of abrasion of the upper surfaces of the supporters 226 and 227 to be caused by long time use. For example, when a maximum value of the distance of the gap "t" is set to about 1 mm, sensing capability of the sensor 30 can be secured while contact between the rotating member 230 and the sensor 30 can be prevented.

In addition, the gap "t" may be set to a value allowing long time use of the supporters 226 and 227 until the supporters 226 and 227 are abraded to the same height as the rotating member 230.

An elastic member 240 is connected to the second extension part 225 to draw the second extension part 225 in a direction indicated by an arrow in FIG. 4. While being transferred, the medium 5 may press the plurality of the supporters 226 and 227.

When the supporters 226 and 227 are pressed, the supporting parts 221 and 222 may be rotated clockwise about the shafts 223 with respect to FIG. 3. Therefore, the elastic member 240 is extended. When the force of the medium 5 pressing the supporters 226 and 227 is removed, the supporters 226 and 227 return to their initial positions by a recovery force of the elastic member 240.

Although it is explained that the medium 5 presses the supporters 226 and 227, it may be understood that the supporters 226 and 227 press the medium 5 by the recovery force of the elastic member 240.

The sensor 30 is provided corresponding to the supporting parts 221 and 222 in number. That is, the medium detecting device of the first embodiment comprises two sensors 30.

The sensor 30 detects magnetism of the medium 5 passing by the upper surface of the pressing unit 20. Detection data is transmitted to a control unit (not shown). The medium 5 is passed through between the pressing unit 20 and the sensor 30, maintaining contact with the sensor 30 by the pressing unit 20.

A magnetic component may be in a plurality of regions A and B of the medium 5. The sensors 30 respectively detect magnetism of the regions A and B of the medium 5.

The sensors 30 detect magnetism of the medium 5, and more specifically, detect variation of magnetic flux. Accordingly, each sensors 30 output data according to the variation of magnetic flux. If a waveform of the data output from the sensor 30 varies while the medium 5 is passing by the sensor 30, it is determined that the medium 5 is a genuine banknote or check. On the other hand, if there occurs no variation of the waveform of the data output from the sensor 30 during passage of the medium 5 or if a width of the variation is less than a reference width, the medium 5 is determined to be a counterfeit banknote or check.

Differently from the above, for example, the respective sensors 30 may output a voltage value. When the output voltage value is within a reference voltage range, the medium 5 may be determined to be a genuine banknote or check. When the output voltage value is out of the reference voltage range, it may be determined that the medium 5 is a counterfeit banknote or check or that an error occurs.

More specifically, the medium 5 is determined to be counterfeit when the output voltage is less than a minimum value of the reference voltage range, and to be genuine when the output voltage is within the reference voltage range. In addition, when the output voltage is greater than a maximum value of the reference voltage range, it is determined to be an error. When it is determined that the medium 5 is counterfeit or that an error occurs, the medium 5 may be moved to a storage box (not shown) and stored separately from genuine ones.

Hereinafter, a process in that the medium 5 passes through between the sensors 30 and the pressing unit 20 will be explained.

The medium 5 is transferred by the transfer unit 40 and passed through between the sensor 30 and the pressing unit 20. When the medium 5 is disposed on the upper surfaces of the supporters 226 and 227, the supporters 226 and 227 are pressed by the medium 5 while pressing the medium 5 toward the sensor 30 by elasticity of the elastic member 240. In this state, the sensor 30 is able to detect the medium 5.

Since the rotating member 230 is mounted between the supporters 226 and 227, the sensing capability is not affected although the medium 5 droops. Furthermore, since the rotating member 230 supports a drooping portion of the medium 5, occurrence of a jam may be prevented during the transfer of the medium 5.

Figure 5:
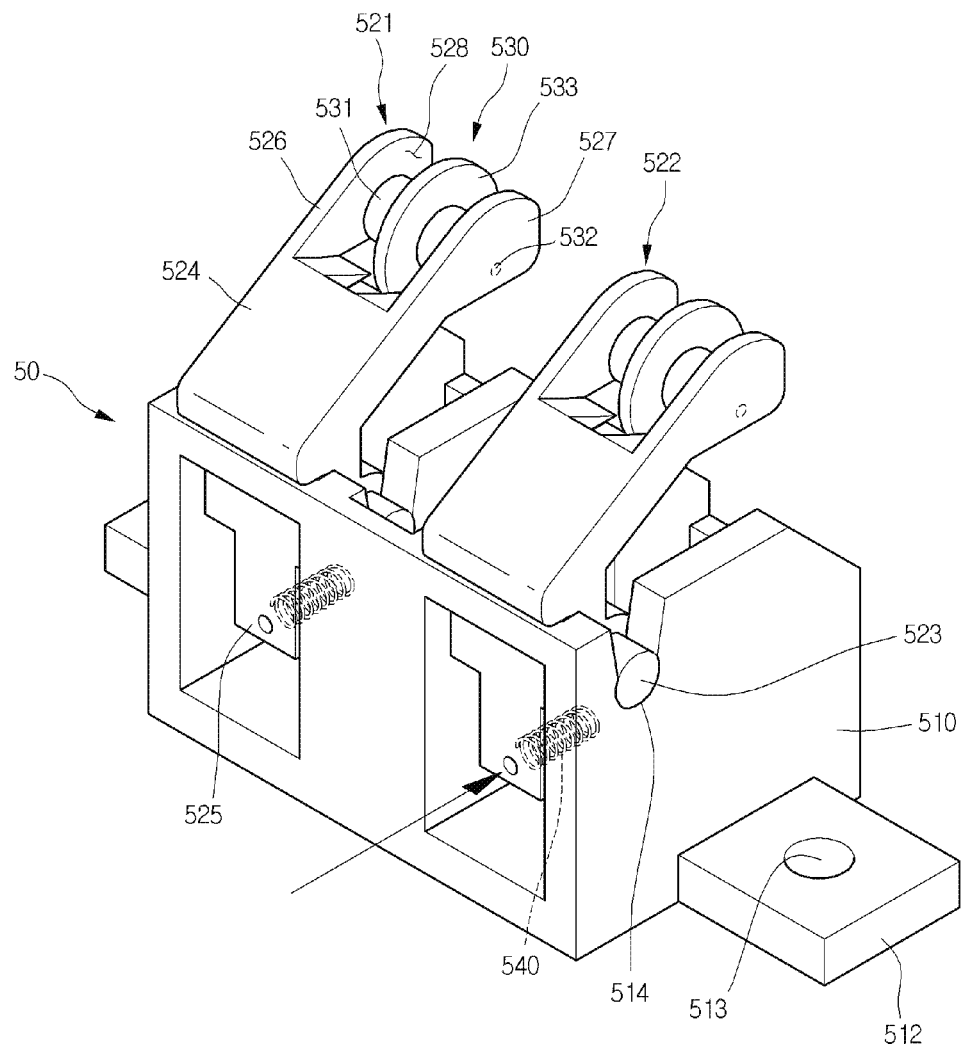
FIG. 5 is a perspective view of a pressing unit according to another embodiment.

FIG. 5 is a perspective view of a pressing unit according to a second embodiment.

Only a rotating member of the second embodiment is distinctive whereas the other parts are the same as of the first embodiment. Therefore, only the distinctive features will be explained hereinafter and the other parts will be cited as explained in the first embodiment.

Referring to FIG. 5, a pressing unit 50 of the second embodiment comprises a mounting part 510 mounted in the main body 10, one or more supporting parts 521 and 522 rotatably supported by the mounting part 510, and a rotating member 530 rotatably supported by each of the one or more supporting parts 521 and 522 while being in partial contact with the medium 5 being transferred.

The mounting part 510 comprises a fixing plate 512 for fixing the mounting part 510 to a predetermined position of the main body 10. The fixing plate 512 includes a fastening hole 513 for engagement with a fastening member such as a screw. In addition, a shaft seating part 514 to seat thereon shafts 523 of the respective supporting parts 521 and 522 is formed at an upper part of the mounting part 510.

Each of the supporting parts 521 and 522 comprises the shaft 523, a first extension part 524 extending upward from the shaft 523, and a second extension part 525 extending downward from the shaft 523. The first extension part 524 comprises a plurality of supporters 526 and 527 for coupling with the rotating member 530.

The supporters 526 and 527 are spaced apart from each other, with a space 528 formed therebetween for disposition of the rotating member 530. During transfer of the medium 5, a transferring force of the medium 5 is transmitted to the rotating member 530 in contact with the medium 5, thereby rotating the rotating member 530. That is, the rotating member 530 is rotated by friction against the medium 5.

The rotating member 530 comprises a rotation body 531 rotatably coupled to the supporters 526 and 527 through a rotational shaft 532. The rotating member 530 comprises at least one contact part 533 protruding in a circumferential direction of the rotation body 531 to be in contact with the medium 5 being transferred. Therefore, the supporters 526 and 527 and the contact part 553 support the medium 5.

A thickness of the contact part 533 is smaller than a lateral width of the sensor 50. Especially, the contact part 533 may be formed to have a minimum thickness as long as being capable of supporting the medium 5, so as to minimize damage of the sensor 30.

To stably support the medium 5, the contact part 533 may be disposed on a position bisecting the rotating member 531 in a length direction.

In addition, a vertical distance from the rotational shaft 532 to a highest position of each of the supporters 526 and 527 may be set to be substantially equal to a radius of the rotation body 531 at the portion on which the contact part 533 is disposed so that the plurality of supporters 526 and 527 and the contact part 533 simultaneously support the medium 5.

According to the second embodiment, the rotating member 530 is rotated as the contact part 533 of the rotating member 530 frictionizes the medium 5 being transferred. Here, since the contact part 533 forms a line contact with the medium 5, the contact part 533 may be smeared with as little dust of the medium 5 as possible.

Although the contact part 533 is smeared with dust, the dust fall down from the contact part 533 due to a rotating motion of the rotating member 530, thereby being prevented from remaining on the contact part 533. Accordingly, addition of the dust to the medium 5 may also be prevented, thereby increasing sensing accuracy of the sensor 30.

Since not only the supporters 526 and 527 but also the contact part 533 support the medium 5 in second embodiment, droop of the medium 5 between the supporters 526 and 527 can be prevented, accordingly promoting transfer of the medium 5. In addition, reduction of the sensing accuracy of the sensor 30 may be prevented.

Furthermore, since the contact part 533 being in contact with the sensor 30 has the minimum thickness, droop of the medium 5 is prevented and therefore a jam of the medium 5 is prevented. Also, damage of the sensor 30 may be minimized with the sensing accuracy of the sensor 30 increased.

Figure 6:
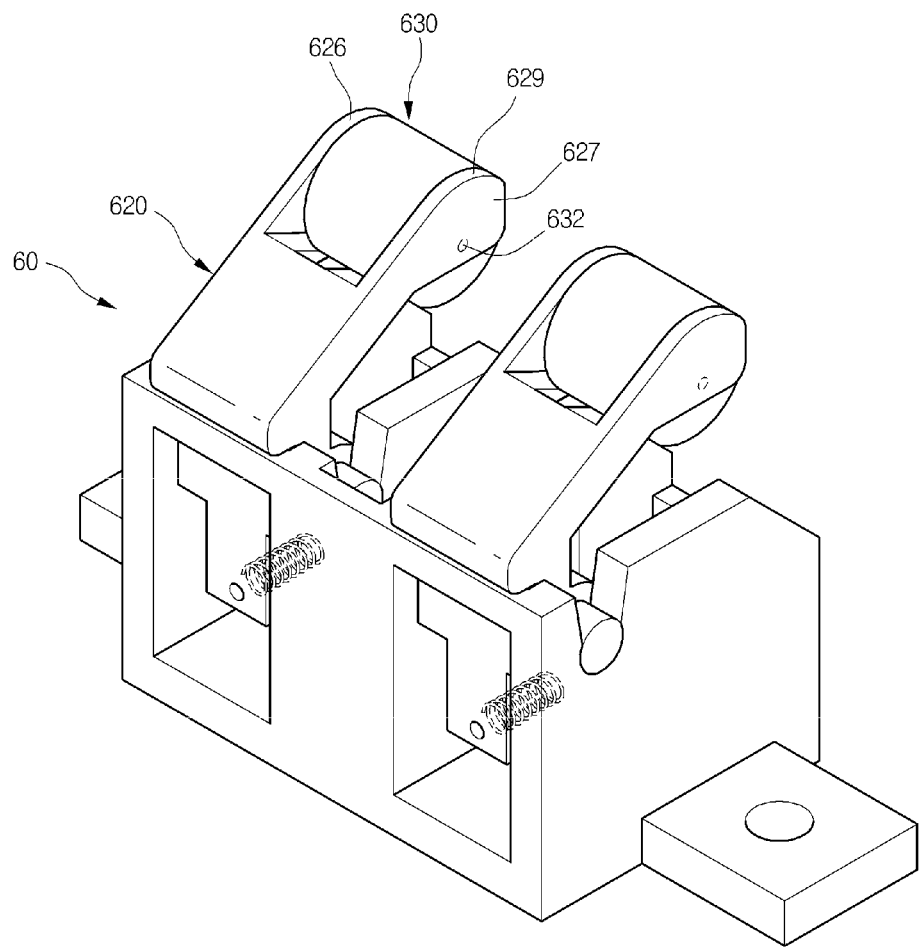
FIG. 6 is a perspective view of a pressing unit according to still another embodiment.

FIG. 6 is a perspective view of a pressing unit according to a third embodiment.

Only the structure of a rotating member of the third embodiment is distinctive whereas the other parts are the same as in the first embodiment. Therefore, a description will now be made about the distinctive feature.

Referring to FIG. 6, a pressing unit 60 according to the third embodiment comprises a plurality of supporting parts 620. Each of the supporting parts 620 comprises a plurality of supporters 626 and 627. A rotating member 630 is disposed between the supporters 626 and 627. The rotating member 630 is rotatably connected between the supporters 626 and 627 through a rotational shaft 632. The rotating member 630 has a cylindrical shape and is rotated during transfer of the medium 5. According to the third embodiment, the rotating member 630 forms a line contact with the medium 5 through the entire length thereof. A radius of the rotating member 630 may be substantially equal to a vertical distance from the rotational shaft 632 to a highest position 629 of each of the supporters 626 and 627.

According to the third embodiment, since a contact area between the rotating member 630 and the medium 5 increased in comparison with the first embodiment, the medium 5 is more stably supported.

Although the rotating member 630 is in contact with the medium 5, since the rotating member 630 rotates during the transfer of the medium 5, the sensor may be protected from damage or scratch caused by the medium 5.

Figure 7:
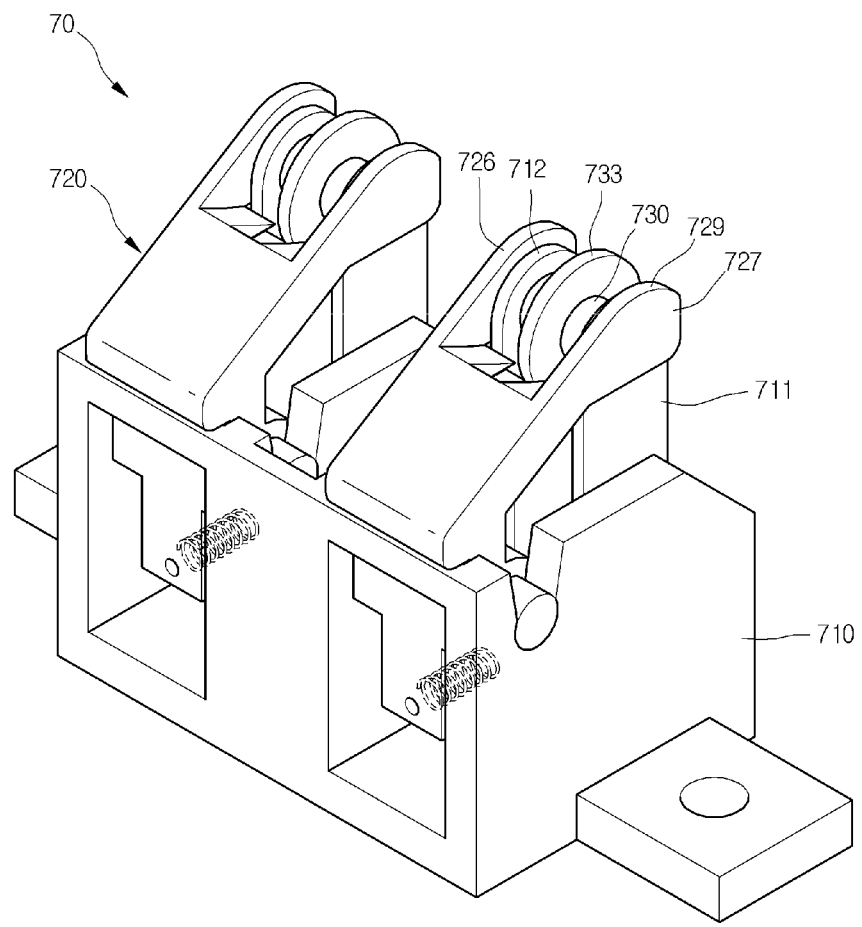
FIG. 7 is a perspective view of pressing unit according to further another embodiment.
Figure 8:
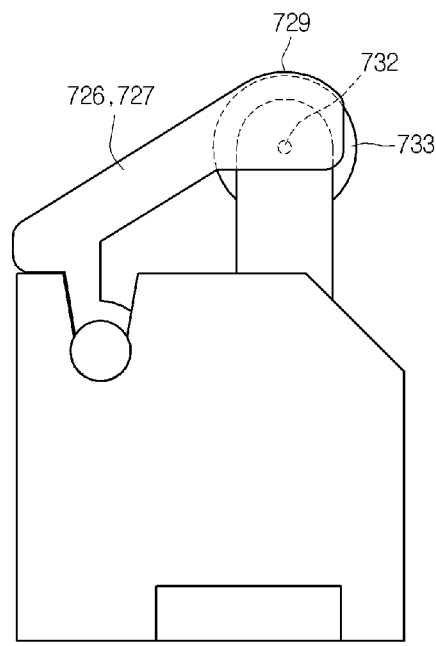
FIG. 8 is a side view of the pressing unit shown in FIG. 7.

FIG. 7 is a perspective view of pressing unit according to a fourth embodiment. FIG. 8 is a side view of the pressing unit shown in FIG. 7.

The fourth embodiment has the same structure as the first embodiment except that a rotating member is rotatably supported by a mounting part. Therefore, hereinafter, only the distinctive feature of the fourth embodiment will be described.

Referring to FIGS. 7 and 8, a pressing unit 70 of the present embodiment comprises a mounting part 710, a supporting part 720, and a rotating member 730.

A plurality of extension parts 711 and 712 are extending upward from an upper part of the mounting part 710. The extension parts 711 and 712 are spaced from each other and the rotating member 730 is rotatably connected between the extension parts 711 and 712 through a rotational shaft 732. A contact part 733 is formed around the rotating member 730. The contact part 733 is brought into contact with the medium 5 during transfer of the medium 5.

The supporting part 720 comprises a plurality of supporters 726 and 727 to support the medium 5. The extension parts 711 and 712 and the rotating member 730 are disposed between the supporters 726 and 727.

Without any external force applied to the supporters 726 and 727, a vertical distance from the rotational shaft 732 to a highest position 729 of each of the supporters 726 and 727 is greater than a radius of the contact part 733.

When the supporters 726 and 727 are pressed by the medium 5 passing on the supporter 726 and 727, the supporting part 720 is rotated and accordingly the vertical distance from the rotational shaft 732 to the highest position of each of the supporters 726 and 727 becomes substantially equal to the radius of the contact part 733. As a result, the plurality of supporters 726 and 727 and the contact part 733 support the medium 5. That is, as the medium 5 is transferred, the rotating member 730 rotatably mounted to the mounting part 710 which is static is not rotated along with the supporting part 720 is rotated by the medium 5 being transferred. In addition, the supporting part 720 is rotated about the rotational shaft 732 according to the transfer of the medium 5, thereby supporting the medium 5 together with the rotating member 730.

According to the fourth embodiment described above, since the contact part 733 is disposed lower than the highest position 729 of the supporters 726 and 727 when there is no medium 5, contact between the contact part 733 and the sensor 30 is prevented, thereby minimizing damage of the sensor 30. Simultaneously, the sensor 30 may be prevented from contact with dust as much as possible. In addition, since the medium 5 is brought into contact with the contact part 733 after contacting the supporters 726 and 727, a contact area and contact time between the medium 5 and the contact part 733 can be reduced. Therefore, the contact part 733 may be less smeared with dust.

Although, according to the fourth embodiment, one or more contact parts are provided to the rotating member and brought into contact with the medium, the present invention is not limited thereto. It is noted that the rotating member may have a cylindrical shape as in the second introduced embodiment and directly contact the medium.

Even when all the elements of the embodiments of the invention are combined into one or operated in the combined state, the invention is not limited to such an embodiment. That is, all the elements may be selectively combined with each other without departing the scope of the invention. Furthermore, when it is described that one comprises (or includes or has) some elements, it should be understood that it may comprise (or include or has) only those elements, or it may comprise (or include or have) other elements as well as those elements if there is no specific limitation. Unless otherwise specifically defined herein, all terms including technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiment disclosed in the present invention has been described not for limiting the scope of the invention, but for describing the invention. Accordingly, the scope of the invention is not limited by the above embodiments but by the claims and the equivalents thereof. The range of protection of the present invention should be interpreted based on the accompanying claims, and all technical spirits falling within a range equivalent to the range should be interpreted as being included in the range of the rights of the present invention.

The invention claimed is:

1. A medium detecting device comprising:
   a sensor adapted to detect magnetism of a medium being transferred;
   a sensor housing for protecting the sensor; and
   a pressing unit adapted to press the medium toward the sensor,
   wherein the pressing unit comprises:
   at least one supporting part comprising a body, and a plurality of supporters extended from the body to press the medium toward the sensor; and
   an elastic member elastically supporting the supporting part;
   wherein the sensor is disposed between two of the plurality of supporters;
   wherein the plurality of supporters is not in contact with the sensor but in contact with the sensor housing; and
   wherein the plurality of supporters directly supports the medium when the medium is transferred.

2. The medium detecting device in claim 1, wherein the plurality of supporters are spaced from each other by a predetermined interval, and
   a rotating member is rotatably disposed between the supporters.

3. The medium detecting device in claim 2, wherein the rotating member is rotatably mounted to the plurality of supporters.

4. The medium detecting device in claim 2, wherein an upper end of the rotating member is disposed lower than an upper end of the supporters.

5. The medium detecting device in claim 2, wherein the rotating member has a cylindrical shape and is in contact with the medium partly or entirely in a length direction thereof.

6. The medium detecting device in claim 2, wherein the rotating member comprises a rotation body, and at least one contact part protruding in a circumferential direction of the rotation body to contact the medium.

7. The medium detecting device in claim 2, further comprising a mounting part adapted to rotatably support the supporting part,
   wherein the rotating member is rotatably mounted to the mounting part.

8. The medium detecting device in claim 2, wherein the sensor is disposed in a region between the supporters such that the supporters do not overlap the sensor.

9. The medium detecting device in claim 1, further comprising a mounting part adapted to rotatably support the supporting part,
   wherein the elastic member is mounted to the mounting part to apply an elastic force to the supporting part such that the supporting part is biased toward the sensor.

10. An automated teller machine comprising:
    a medium entrance through which a medium is inserted and withdrawn;
    a transfer unit adapted to transfer the medium inserted through the entrance;
    a sensor adapted to detect magnetism of the medium being transferred by the transfer unit;
    a sensor housing for protecting the sensor; and
    a supporting part adapted to support the medium being transferred;
    wherein the supporting part comprises a body and a plurality of supporters ex tended from the body, the plurality of supporters being spaced apart from each other,
    wherein the sensor is disposed between two of the plurality of supporters;
    wherein the plurality of supporters is not in contact with the sensor but in contact with the sensor housing; and
    wherein the plurality of supporters directly supports the medium when the medium is transferred.

11. The automated teller machine in claim 10, further comprising a rotating member mounted to the plurality of supporters and disposed between the supporters.

12. The automated teller machine in claim 11, wherein the rotating member is spaced apart from the sensor.

13. The automated teller machine in claim 11, wherein the rotating member is partly or entirely in contact with the sensor.

14. The automated teller machine in claim 10, further comprising a mounting part adapted to rotatably support the supporting part, wherein the mounting part comprises a rotating member, and the rotating member is disposed between the plurality of supporters.

* * * * *